(12) United States Patent
Tavares et al.

(10) Patent No.: US 9,049,015 B2
(45) Date of Patent: Jun. 2, 2015

(54) ALLOWING TCP ACK TO PASS A GATEWAY WHILE QUEUING DATA FOR PARSING

(75) Inventors: Humberto Tavares, Cary, NC (US);
Chris O'Rourke, Apex, NC (US);
Robert Batz, Raleigh, NC (US);
Franklin Jones, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 2030 days.

(21) Appl. No.: 11/854,299

(22) Filed: Sep. 12, 2007

(65) Prior Publication Data

US 2009/0067416 A1 Mar. 12, 2009

(51) Int. Cl.
| | |
|---|---|
| *H04L 12/56* | (2006.01) |
| *H04L 12/26* | (2006.01) |
| *H04L 12/24* | (2006.01) |
| *H04L 12/66* | (2006.01) |
| *H04L 1/16* | (2006.01) |
| *H04L 12/801* | (2013.01) |
| *H04L 1/00* | (2006.01) |

(52) U.S. Cl.
CPC .............. *H04L 1/1607* (2013.01); *H04L 47/10* (2013.01); *H04L 2001/0092* (2013.01)

(58) Field of Classification Search
CPC ..... H04L 47/10; H04L 1/1607; H04L 69/163; H04L 47/34–47/35; H04L 1/1841; H04L 43/0829; H04L 43/0823; H04L 43/0847; H04L 49/9057; H04L 1/1621; H04L 47/12; H04L 47/27; H04L 43/08; H04L 1/1823; H04L 2001/0097; H04L 12/5855; H04W 28/04; H04W 24/06

USPC ......... 370/352, 355, 338, 349, 468, 389, 254, 370/252, 394, 401, 229–238, 315–316, 370/398–392, 243, 246, 275, 429, 501, 370/400; 709/234, 235
See application file for complete search history.

(56) References Cited

U.S. PATENT DOCUMENTS

| | | | |
|---|---|---|---|
| 6,590,895 B1* | 7/2003 | Gupta et al. | 370/394 |
| 6,728,247 B1* | 4/2004 | Meyer et al. | 370/394 |
| 6,757,248 B1* | 6/2004 | Li et al. | 370/235 |

(Continued)

OTHER PUBLICATIONS

"Chapter 7—Configuring PSD Support", Cisco Content Services Gateway—2nd Generation Installation and Configuration Guide, Copyright 1992-2007 Cisco Systems, Inc., 6 pages.

*Primary Examiner* — Wutchung Chu
(74) *Attorney, Agent, or Firm* — Patent Capital Group (57) ABSTRACT

In one embodiment, a method for providing an ACK packet while queuing data is provided. One or more packets in a series of packets may be received from a client at a gateway. The gateway determines that a packet in the series of packets has not been received. The one or more packets are then queued. The queued packets may have included an ACK for one or more previously sent packets. Thus, if the gateway had forwarded the one or more packets that are queued, then the ACK would have been received by the server. However, the one or more packets are queued and thus the ACK included in the packets is not sent with the queued packets. Even though the plurality of packets are queued, an acknowledgement packet is generated and then sent for the previously sent packets. The acknowledgement packet acknowledges to the server that the one or more previously sent packets were received by the client. The server may then continue transmitting packets to the client and knows it does not need to retransmit the one or more previously sent packets.

23 Claims, 5 Drawing Sheets

(56) References Cited

U.S. PATENT DOCUMENTS

| | | | |
|---|---|---|---|
| 6,920,598 B2 * | 7/2005 | Chen et al. | 714/748 |
| 7,327,735 B2 * | 2/2008 | Robotham et al. | 370/394 |
| 7,643,427 B2 * | 1/2010 | Kokku et al. | 370/238 |
| 7,698,453 B2 * | 4/2010 | Samuels et al. | 709/234 |
| 7,784,084 B2 * | 8/2010 | Ng et al. | 726/3 |
| 7,965,698 B2 * | 6/2011 | Jung | 370/349 |
| 8,014,274 B1 * | 9/2011 | Amicangioli et al. | 370/216 |
| 2004/0100964 A1 * | 5/2004 | Robotham et al. | 370/394 |
| 2005/0036511 A1 * | 2/2005 | Baratakke et al. | 370/469 |
| 2005/0036544 A1 * | 2/2005 | Webb et al. | 375/240.03 |
| 2006/0045024 A1 * | 3/2006 | Previdi et al. | 370/254 |
| 2006/0184664 A1 * | 8/2006 | Jung | 709/224 |
| 2006/0221825 A1 * | 10/2006 | Okano | 370/229 |
| 2007/0091894 A1 * | 4/2007 | Kang et al. | 370/394 |

* cited by examiner

ALLOWING TCP ACK TO PASS A GATEWAY WHILE QUEUING DATA FOR PARSING

TECHNICAL FIELD

Particular embodiments generally relate to networking.

BACKGROUND

A client can establish a connection with a server and request data. The server can then respond to the request with packets of data. In response, the client can send additional packets requesting more data from the server. The additional packets also include an acknowledgement (ACK) for the received packets of data. The ACK allows the server to know that the packets it sent were received successfully and that it can continue to send more data. For example, a transmission control protocol (TCP) window, which is the amount of outstanding data the server can send before receiving acknowledgement, may be reached and the server has to stop sending data.

The packets sent between the client and server may pass through a billing gateway, which may be configured to inspect the packets for billing purposes, etc. If one of the TCP packets sent from the client is lost before it is received by the billing gateway, the billing gateway queues the subsequent packets it receives and waits for the lost packet. For example, if three TCP packets are sent from the client in sequence and a first one is lost, then the second and third packets are queued until the first packet is received. This may be because a request is spread across the payload of these packets and the entire request needs to be parsed in order to bill the packets properly prior to sending the packets to the server. Because of the queuing, the packets including the ACKs for the previously sent packets are not sent to the server. When the server does not receive an ACK, the server may re-transmit the packets it previously sent after not receiving an ACK for the sequence number associated with these packets. After retransmission, the client may resend the lost packet and then the lost packet and the queued packets may be sent to the server. Because the server retransmitted the packets, an increase in network traffic occurs, which may be undesirable. Also, servers may not tolerate many occurrences of retransmission behavior and may close the connection with the client. Further, even if servers are tolerant of retransmissions, they may reduce the transmission control protocol (TCP) window, which increases TCP overhead and slows connection throughput.

DESCRIPTION OF EXAMPLE EMBODIMENTS

Overview

In one embodiment, a method for providing an ACK packet while queuing data is provided. One or more packets in a series of packets may be received from a client at a billing gateway. The billing gateway determines that a packet in the series of packets has not been received. The one or more packets are then queued. The queued packets may have included an ACK for one or more previously sent packets. Thus, if the billing gateway had forwarded the one or more packets that are queued, then the ACK would have been received by the server. However, the one or more packets are queued and thus the ACK included in the packets is not sent with the queued packets. Even though the plurality of packets are queued, an ACK packet is generated and then sent for the previously sent packets. The ACK packet acknowledges to the server that the one or more previously sent packets were received by the client without transmitting the payload attached to the queued client packets. The ACK indicates to the server that it can continue transmitting packets to the client and knows it does not need to retransmit the one or more previously sent packets. Thus, the ACK may acknowledge that a lost packet that was not received at the billing gateway was received at the client.

Example Embodiments

Particular embodiments provide techniques for ACK'ing data received at a client from a server. A billing gateway may sit in between the client and server and forward packets between them. The client may ACK packets received from the server by including an ACK in a subsequent request for the server. The subsequent request may be sent in a series of packets that include an ACK for packets sent from the server to the client. If one of those packets is lost in between the client and the billing gateway, the billing gateway queues all of the received packets. Thus, the ACK in the queued packets is not sent to the server. Thus, the billing gateway may generate one or more ACK packets and send them to the server. This indicates to the server that the packets it sent to the client were received. The server may then continue to send data to the client.

Figure 1:
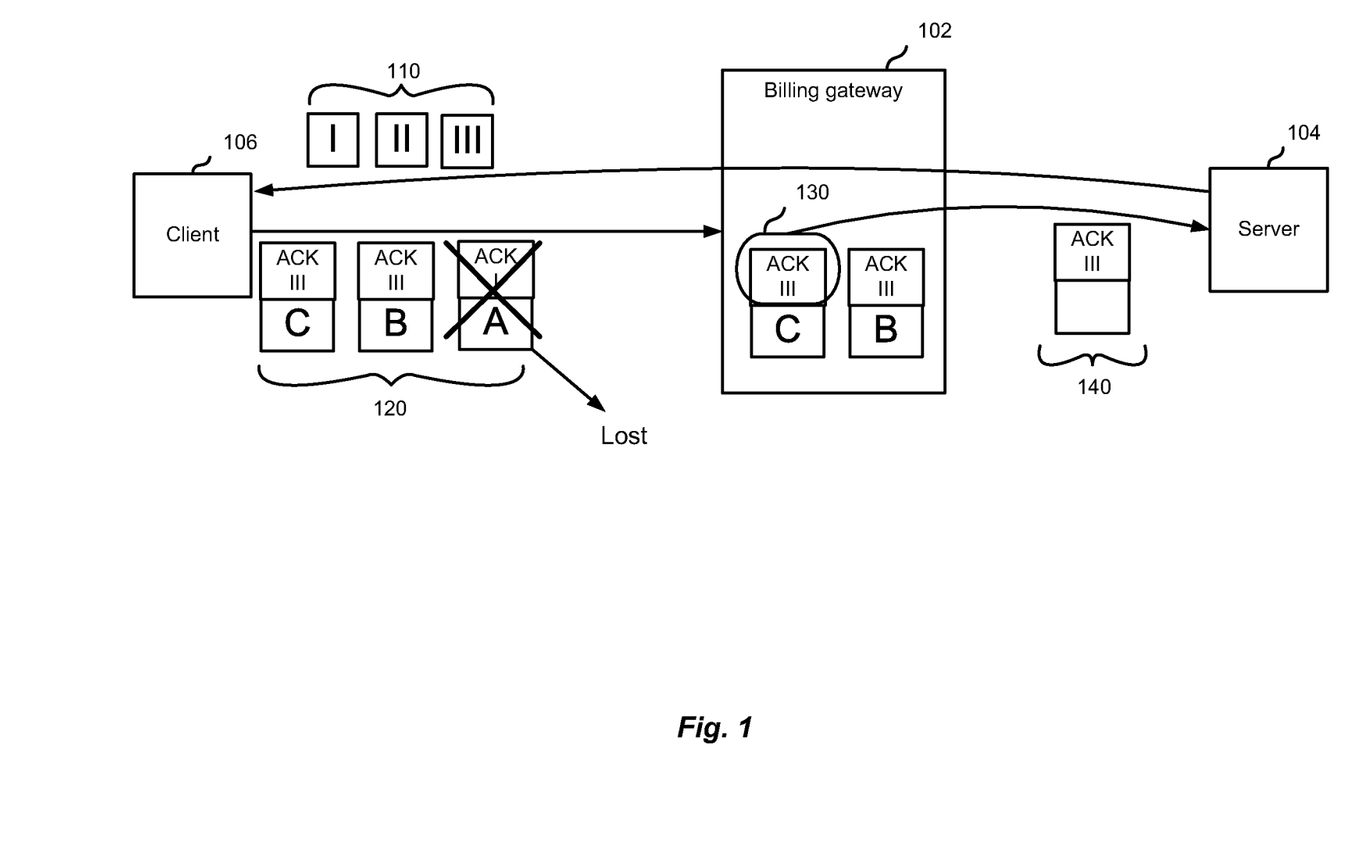
FIG. 1 depicts an example of a system for sending an ACK packet while queuing data.

FIG. 1 depicts an example of a system for sending an ACK packet while queuing data. As shown, a billing gateway 102 sits in between communications from a server 104 and a client 106.

Client 106 may be any suitable client device, such as a personal computer, laptop computer, cellular phone, smartphone, personal digital assistant (PDA), set top box, etc. In one embodiment, client 106 may include applications that may be used to request data from server 104. For example, a web browser may be used to send requests through the Internet to server 104.

Server 104 may be any suitable computing device that can respond to requests from client 106. For example, server 104 may be a web server that responds to hypertext transfer protocol (HTTP) requests. In response to the requests, server 104 may send data in packets to client 106.

Billing gateway 102 may be a device that sits in between client 106 and server 104 and receives packets sent between client 106 and server 104. Although billing gateway is used, it will be understood that functions other than billing may be provided and also providing billing is not necessary. Other intermediary devices such as a switch, router, server, network processor, etc. may similarly be used to implement the functionality described herein. Billing gateway 102 can transparently modify a TCP flow without having to terminate each connection between clients 106 (client and server), or modify the sequence or ACK numbers. In one embodiment, billing gateway 102 may be different from a proxy, which may terminate connections and modify traffic. Billing gateway 102 may parse the packets, and then forward them to client 106 or server 104. In one embodiment, billing gateway 102 needs to parse the packets to determine information that may be used by billing gateway 102 or other devices/applications. For example, billing gateway 102 may be a charging gateway that is configured to determine billing information based on the data sent through it. The packets may be parsed to determine uniform resource locators or other information that can be used for billing (e.g., an amount of data sent), and then clients 106 (or their users) may be appropriately charged or billed for the data sent.

Data packets may be sent in a series of data packets. Also, although sending a series is described, it will be recognized that only one packet may be sent. In one example, server 104 may send a series of data packets to client 106. Before sending an additional series of data packets, server 104 may wait for an ACK from client 106. The ACK may be any acknowledgement that a message or messages have been received. For example, server 104 may be allowed to send a certain amount of outstanding data (unacknowledged data) on a connection before it has to stop sending data. Server 104 can resume sending data on the connection when an ACK is received for at least a portion of the outstanding data.

In one example, server 104 sends packets 110 labeled I, II and III in FIG. 1 to client 106 in response to a request from client 106. Client 106 may then send another request that is included in another series of packets (not shown). Also, acknowledgments that the packets 110 were received from server 104 are included in packets 120 labeled A, B and C. Each packet A, B and C includes an acknowledgement signal, or ACK, corresponding to packets I, II and III, respectively. Although the example is discussed from the direction of client 106 to server 104, it will be understood that the communications may be from server 104 to client 106. In some cases, a packet may be lost when it is sent from client 106 to billing gateway 102. This is illustrated in FIG. 1 which shows packet A being "lost". In practice, any delay, corruption, whole or partial loss of data, or other effects may cause a packet to be "lost" or not received when expected at a receiving device. Typically, a protocol such as transmission control protocol (TCP) is used to send data. TCP attempts to guarantee reliable and in-order delivery of data from sender to receiver. Other protocols may also be used, such as stream control transfer protocol (SCTP).

When a packet is lost, billing gateway 102 is configured to queue the packets received in the series until the lost packet is received. As shown in FIG. 1, packets B and C are received by billing gateway 102 and are queued, or otherwise delayed or held. One reason queuing may be performed is to allow billing gateway 102 to parse requests sent from client 106 to enforce billing, provisioning or other use policies imposed on a sender. In one example, the request may be included in three packets that are sent in the series. Thus, because one packet has not been received, the full request cannot be parsed. The parsing may be required for billing information and all three packets need to be completely parsed to determine the billing information.

In one embodiment, even when a packet is lost and packets are queued, billing gateway 102 is configured to still send an ACK to server 104 indicating that the series of packets I, II and III has been received. The ACK can be sent while billing gateway 102 is still waiting for a lost packet or is otherwise waiting or delaying the relay of packets to server 104 (e.g., client 106 may resend the lost packet). Thus, an ACK packet 140 (in this case included in an empty payload or "naked" packet) is sent that indicates to server 104 that the series of packets I, II and III has been received by client 106. Because server 104 has received an ACK for the prior series of packets, it can continue sending additional packets to client 106. For example, a second series of packets may be sent. Also, server 104 is prevented from retransmitting the first series of packets in response to a timeout condition due to lack of receiving an ACK. This alleviates unnecessary traffic in the network. Also, any restrictions due to retransmission (e.g., shortening of the TCP window) are not initiated by server 104.

Figure 2:
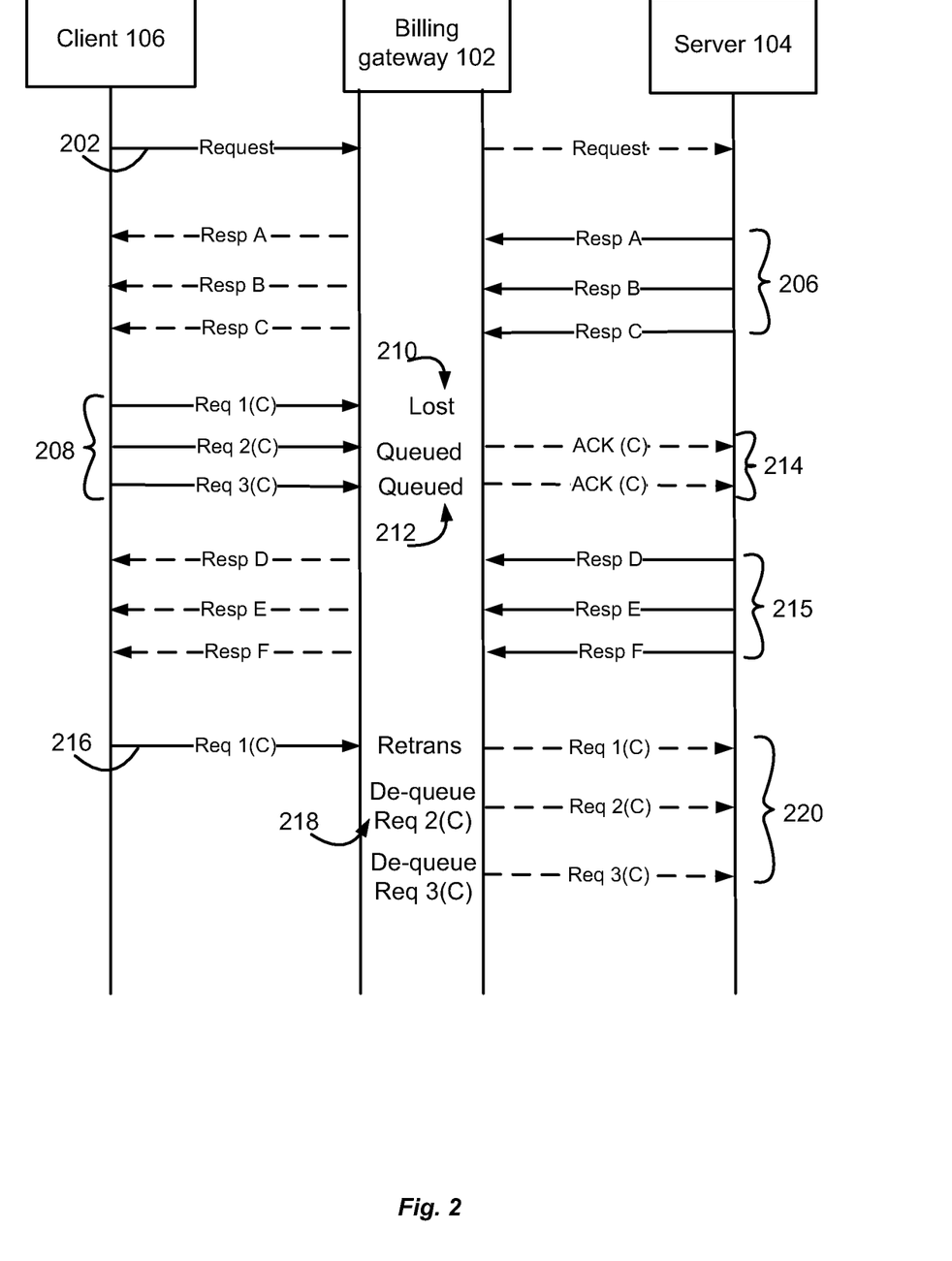
FIG. 2 depicts an example of a data flow.

FIG. 2 depicts an example of a data flow. Although this data flow is described, it will be understood that variations of the data flow may be appreciated. At 202, client 106 may send a request. Billing gateway 102 receives the request and sends it to server 104. The request may be a request for data using TCP. For example, the request may be an HTTP request that is a GET request for a large image. Also, billing gateway 102 may parse the request. For example, a URL may be noted for billing purposes. At 206, server 104 sends response packets A, B, and C. Billing gateway 102 receives the response packets and forwards them to client 106.

In response, client 106 may send a second request at 208, which is sent in request packets 1(C), 2(C), and 3(C). These packets may be a request for more information from server 104. Also, these packets include acknowledgements for receiving response packets A, B, and C. For example, the request packets may include an ACK for response packet C (in this case, server 104 may assume that all packets sent before response packet C have been received if it receives an ACK for response packet C). In one embodiment, the ACK for response packet C is sent in all response packets because only the last request received may be ACK'd. Thus, packets A and B may not be explicitly ACK'd but the ACK for packet C indicates that the series of packets has been received. However, in other embodiments, each request packet may include an ACK for a different response packet, such as an ACK for each of the response packets A, B, and C may be sent. Also, other ways of acknowledging receipt of packets A, B, and C may be appreciated. Also, not all of request packets 1, 2, and 3 need to include an ACK, but the ACK may be included in all the packets for redundancy or error checking.

At 210, the packet for request 1(C) may be lost. Although one packet is described as being lost, any number of packets may be lost. Different ways of determining if a packet was lost may be provided. For example, sequence numbers may be added to packets and thus billing gateway 102 can determine that request 1(C) was lost. Accordingly, at 212, billing gateway 102 queues requests 2(C) and 3(C). This may be because billing gateway 102 needs to completely parse request 1(C) in addition to requests 2(C) and 3(C) before forwarding them to server 104. For example, billing information for the request may be included in all three packets and thus all three packets need to be parsed together to determine the billing information. Although billing is described, the packets may be queued for other reasons, such as packets should not be sent out of order, etc. Because billing gateway 102 queues requests 2(C) and 3(C), the ACK's that are included in those packets are not sent to server 104. That is, the ACKs are included in the header or payload of the request packets. Because the packets are delayed, the ACKs are delayed or held.

At 214, billing gateway 102 sends an ACK for the series of packets sent at 206 to server 104. For example, an ACK is sent for both of the requests 2(C) and 3(C). In one embodiment, an ACK needs to be sent that indicates the series of packets has been received. For example, an ACK with an acknowledgement number corresponding to the last packet in the series of packets is sent. In this case, both ACK packets have an acknowledgement number corresponding to request C. The ACK may be a naked ACK in that it may not include a payload of the request packets. Sending an ACK for request C indicates to server 104 that the series of response packets A, B, and C were received by client 106. This may be useful when request 3(C) is lost because the ACK sent for requests 1(C) and 2(C) may be for response C, thus indicating that the series of response packets A, B, C were received. In other embodiments, the ACK packets may have an acknowledgement number corresponding to each of the packets sent previously, such as an acknowledgement packet for packet B and an acknowledgement packet for packet C. In this case, the ACK that is sent may indicate that the series of packets has been received. For example, the ACK may indicate that responses A, B, and C were received. This may be accomplished by sending an ACK for responses A, B, and C separately. Other variations may be appreciated, but the acknowledgement packet sent to server 104 indicates to it that the packets sent at 206 have been received. This acknowledgement packet is sent even though the packets including an ACK are queued at 212 and despite the fact that the packet including request 1(C) is lost. Thus, particular embodiments provide a way to ACK packets that were received where packets including an ACK are queued. Even though request 1 is lost, which causes request packets 2(C) and 3(C) to be queued, an ACK may be sent that indicates response packets A, B, and C have been received.

At 215, server 104 may send response packets D, E, and F. These packets D, E, and F may be sent before client 106 resends packet 1(C) and may respond to a previous request, such as request 202. For example, the response packets D, E, and F may be additional data that needs to be send to fulfill the request 202 (e.g., more data for an image that was requested). Accordingly, server 104 can continue sending data even though request 1(C) was lost. In this case, billing gateway 102 may forward packets D, E, and F to client 106. Although it is described that server 104 continues to send data, server 104 may not send any data. However, server 104 does not retransmit response packets A, B, and C, but instead waits for the receipt of request packets 1, 2, and 3 before sending any new data. Thus, by sending the ACK for the queued packets, retransmission of response packets A, B, and/or C is avoided.

At some point, client 106 may determine that request packet 1(C) was lost due to the absence of an ACK from billing gateway 102 or server 104 indicating the request packet was received. Client 106 then resends packet 1(C) at 216. For example, a timer may be used where if an ACK is not received for packet 1(C), then client 106 retransmits request packet 1(C). Also, server 104 may only send ACKs for the request sent at 202 and thus client 106 knows that request packet 1(C) has not been received.

At 218, billing gateway 102 can now parse request packet 1(C), and de-queue request packets 2(C) and 3(C). Request packets 2(C) and 3(C) are also parsed and any billing information from the request is determined as needed.

At 220, billing gateway 102 sends request packets 1(C), 2(C), and 3(C) to server 104. These request packets all ACK response packet C but could ACK response packets A, B, and/or C.

In one example, a first request may have been an HTTP request that is a GET request for a large image. Response packets A, B, and C may be a response to the GET request. Request packets 1, 2, and 3 may be subsequent requests for another image or more data. If request packets 1, 2, and 3 are queued and not acknowledged, then server 104 may not be able to send the image. For example, the TCP window may have been reached where server 104 cannot send more data without receiving an ACK for the already sent data. However, server 104 may be ready to send the entire image and it may be undesirable if it cannot send it until request packets 1, 2, and 3 are sent to it. Thus, because an ACK may be sent for requests A, B, and C, server 104 may continue to send the image. Accordingly, server 104 does not have to queue the entire image and may start sending it. This saves time in sending the image to client 106 and also alleviates any delays in sending the image to client 106. Also, retransmission of previously-sent packets is also avoided. Thus, efficient sending of data is provided in addition to the savings of network bandwidth.

Figure 3:
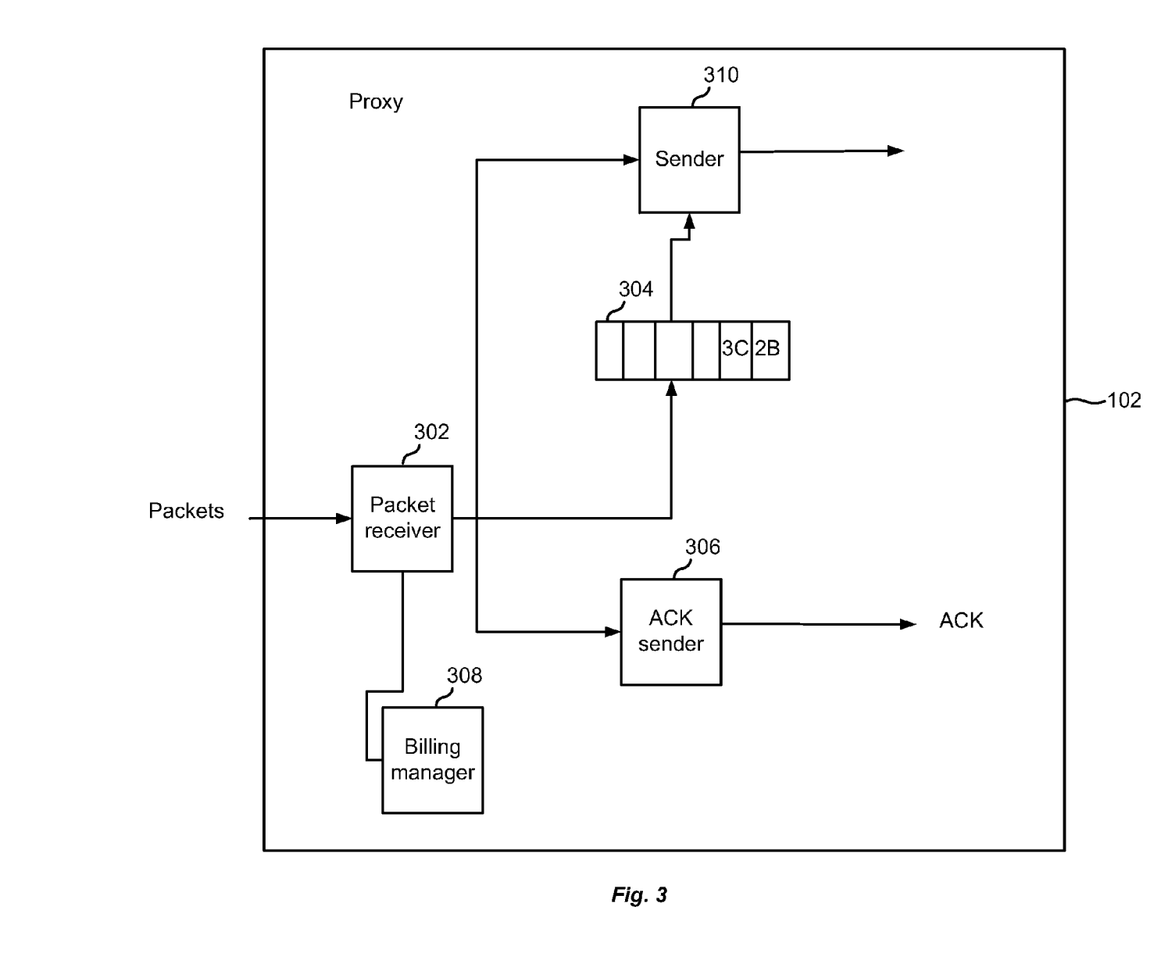
FIG. 3 shows a more detailed embodiment of a billing gateway.

FIG. 3 shows a more detailed embodiment of billing gateway 102. As shown, a packet receiver 302 receives packets from either server 104 or client 106. In one example, packet receiver 302 receives request packets including acknowledgements to response packets sent by server 104. As discussed above, request 1(C) may be lost but request packets 2(C) and 3(C) are received.

Packet receiver 302 then stores request packets 2(C) and 3(C) in a queue 304. Also, an ACK sender 306 is configured to send an ACK for the received packets. For example, an ACK for response C is sent. This indicates to server 104 that the series of packets was received by client 106. The ACK packet may be created with no data in its payload. Also, the ACK packet may have an ACK number corresponding to one of the received packets. For example, the ACK number may be for the last packet in the series of packets received (e.g., response packet C). The ACK number indicates to server 104 that the series of response packets was received and thus it does not need to retransmit the response packets. Thus, even though a packet was lost, which caused packets to be queued, an ACK is generated and sent for the response packets received by client 106.

When request packet 1(C) is received from client 106, a sender 310 is configured to send request packet 1(C) to server 104. Sender 310 also de-queues request packets 2(C) and 3(C) and sends them to server 104.

A billing manager 308 is configured to determine billing information for the packets. For example, before the packets are sent to server 104, billing manager 308 may parse them to determine any billing information needed. The packets containing the request sent by client 106 may not be sent until it can be determined that client 106 or the user of client 106 has sufficient authorization to send or receive packets. For example, billing manager 308 determines if client 106 has enough money or credits in their account to request the information. Also, the amount to charge client 106 cannot be determined until the entire request can be parsed.

Further, no connection state changes are required. That is, no full or half proxy logic is required. Billing gateway 102 is able to generate an ACK packet using the same TCP acknowledgement number as the queued request packets 2(C) and 3(C). The generated ACK packet carries a TCP sequence number that is likely to differ from the sequence number of the queued TCP data packet; the sequence number of the generated ACK packet is the TCP sequence number of the next expected in-order TCP packet that the billing gateway receives for the TCP session and packet flow direction. The billing gateway is not required to establish or maintain a protocol connection to the client or server i.e. proxy a connection for the client, server or both.

Figure 4:
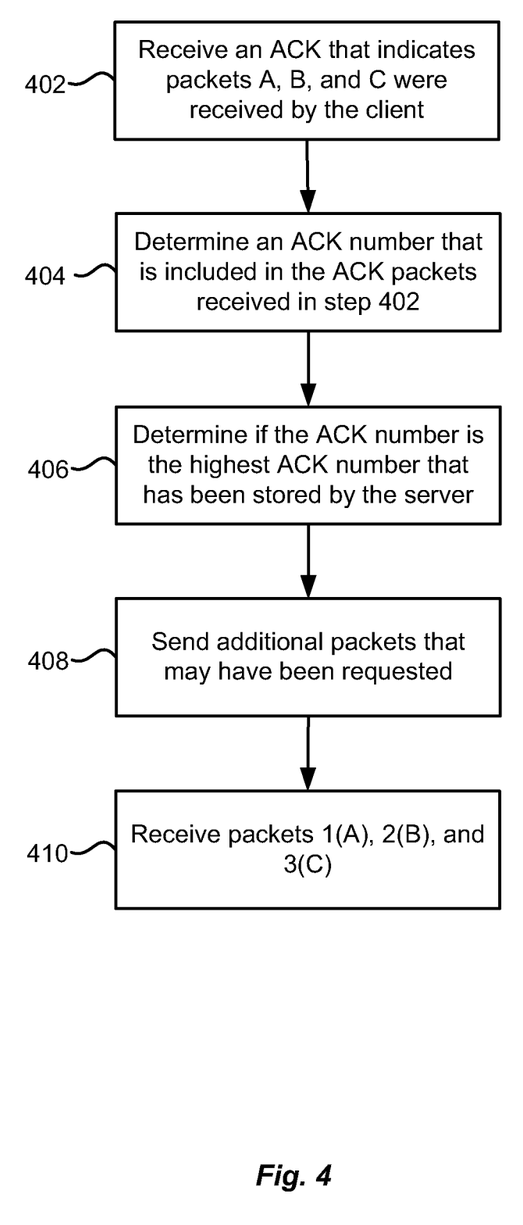
FIG. 4 depicts an example of a method performed at a server.

FIG. 4 depicts an example of a method performed at server 104. Step 402 receives an ACK that indicates response packets A, B, and C were received by client 106. For example, an ACK that corresponds to an ACK included in request packets 2(C) and 3(C) may be received.

Step 404 then determines an ACK number that is included in the ACK packets received in step 402. Different ACK numbers may be included depending on the packet the ACK is for. For example, packet B may be acknowledged with a lower ACK number than packet C. Server 104 may look for the highest ACK number, which is the ACK number for packet C.

Step 406 then determines if the ACK number is the highest ACK number that has been stored by server 104. In one embodiment, server 104 may keep track of the highest sequence number for packets it has sent. If an ACK packet is received that includes the highest sequence number, then server 104 is configured to continue transmission of data.

Step 408 then sends additional packets that may have been requested.

Step 410 then receives request packets 1(C), 2(C), and 3(C). Server 104 can then process request packets 1(C), 2(C), and 3(C). The data (1, 2, 3) may be processed normally, but the ACK portion (C) will be ignored since the ACK numbers acknowledge packets that have already been ACKed (i.e. they are redundant).

Figure 5:
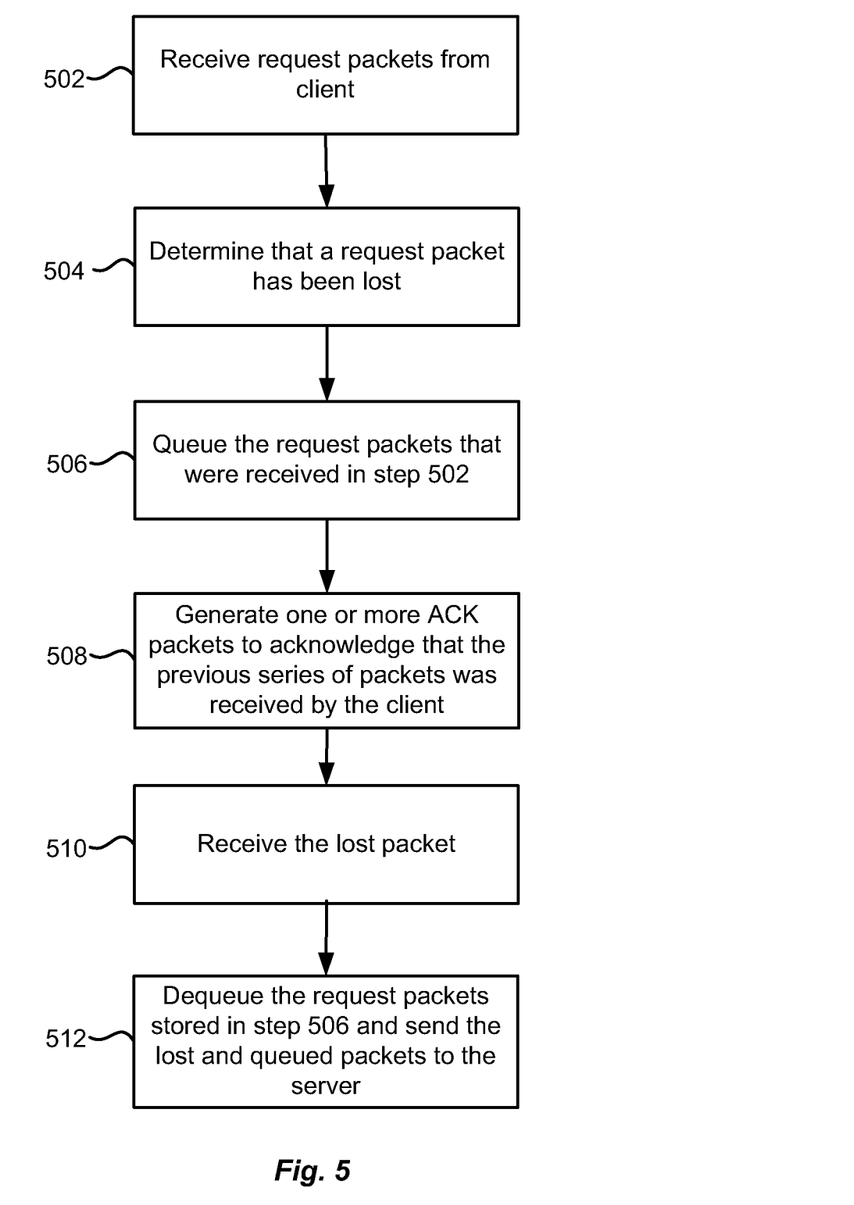
FIG. 5 depicts an example of a method performed at the billing gateway.

FIG. 5 depicts an example of a method performed at billing gateway 102. Step 502 receives request packets from client 106. These request packets may include ACKs for previously sent packets from server 104. For example, the request packets are requesting more data and ACK'ing that a previous series of packets have been received.

Step 504 determines that a request packet has been lost. For example, billing gateway 102 may analyze the sequence numbers to determine that a request was lost.

Step 506 queues the request packets that were received in step 502. Thus, server 104 will not receive the ACKs included in the request packets because they are not sent to server 104.

Step 508 generates one or more ACK packets to acknowledge that the previous series of packets was received by client 106. For example, an ACK packet acknowledging the last packet sent by server 104 is sent.

Step 510 then receives the lost packet. Step 512 dequeues the request packets stored in step 506 and sends the lost and queued packets to server 104.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   receiving, at an intermediary device, a first packet of a request from a first device, wherein the request is destined for a second device, the first packet including a first acknowledgement for a second packet previously sent from the second device to the first device;
   determining a third packet of the request from the first device was not received at the intermediary device;
   detecting the first acknowledgement in the first packet, the first acknowledgement acknowledging receipt of the second packet previously sent from the second device to the first device;
   generating, at the intermediary device, an acknowledgement packet comprising a second acknowledgement indicating to the second device that the second packet was received by the first device; and
   while delaying the first packet due to the third packet not received, sending, from the intermediary device, the second acknowledgement in the acknowledgement packet to the second device.

2. The method of claim 1, further comprising:
   determining an acknowledgement number for the second packet; and
   inserting the acknowledgement number in the acknowledgement packet.

3. The method of claim 2, wherein the acknowledgment packet comprising the second acknowledgement does not include a payload.

4. The method of claim 1, further comprising:
   receiving, at the intermediary device, the third packet not received from the first device; and
   sending the received third packet and the first packet to the second device.

5. The method of claim 4, further comprising:
   parsing the received third packet and the first packet to determine billing information for the first device.

6. The method of claim 1, further comprising:
   receiving, at the intermediary device, a request packet for data from the first device for the second device;
   forwarding the request packet to the second device;
   receiving the second packet from the second device for the first device, the second packet in response to the request packet;
   forwarding the second packet to the first device, wherein the second acknowledgement acknowledges that the second packet sent from the second device was received by the first device.

7. The method of claim 1, wherein determining the third packet was not received comprises identifying a missing sequence number in the request based on a sequence number in the first packet.

8. The method of claim 1, wherein the second acknowledgement acknowledges that a series of packets including the second packet was received by the first device from the second device.

9. A system comprising:
   a client;
   a server configured to send at least one packet to the client; and
   an intermediary device configured to:
   receive, at an intermediary device, a first packet of a request from the client, wherein the request is destined for the server, the first packet including an acknowledgement for a second previously sent from the server to the client;
   determine a third packet of the request from the client was not received at the intermediary device;
   detect a first acknowledgement in the first packet, the first acknowledgement acknowledging receipt of the second packet previously sent from the server to the client;
   generate, at the intermediary device, an acknowledgement packet comprising a second acknowledgement indicating to the second device that the second packet was received by the first device; and
   while delaying the first packet due to the third packet not received, send, from the intermediary device, the second acknowledgement in the acknowledgement packet to the server.

10. The system of claim 9, wherein the server does not re-transmit the second packet after receiving the second acknowledgement.

11. The system of claim 9, wherein the server continues to send data to the client upon receiving the second acknowledgement.

12. The system of claim 9, wherein the client is configured to resend the lost third packet to the intermediary device, wherein the intermediary device is configured to:
    receive the third packet not received from the client; and
    send the received third packet and the first packet to the second device.

13. The system of claim 12, wherein the server is configured to process the received third packet and the first packet.

14. The system of claim 9, wherein the intermediary device is configured to determine that the third packet was not received based on a sequence number in the first packet.

15. The system of claim 9, wherein the second acknowledgement acknowledges to the server that a series of packets including the second packet was received by the client from the server.

16. An apparatus comprising:
    one or more processors; and
    logic encoded in one or more tangible media for execution by the one or more processors and when executed operable to:
    receive, at an intermediary device, a first packet of a request from a first device, wherein the request is destined for a second device, the first packet including an acknowledgement for a second previously sent from the second device to the first device;
    determine a third packet of the request from the first device was not received at the intermediary device;
    detect a first acknowledgement in the first packet, the first acknowledgement acknowledging receipt of the second packet previously sent from the second device to the first device;
    generate, at the intermediary device, an acknowledgement packet comprising a second acknowledgement indicating to the second device that the second packet was received by the first device; and
    while delaying the first packet due to the third packet not received, send, from the intermediary device, the second acknowledgement in the acknowledgement packet to the second device.

17. The apparatus of claim 16, wherein the logic is further operable to:
    determine an acknowledgement number for the second packet; and
    insert the acknowledgement number in the acknowledgement packet.

18. The apparatus of claim 17, wherein the acknowledgment packet comprising the second acknowledgement does not include a payload.

19. The apparatus of claim 16, wherein the logic is further operable to:
  receive the third packet not received from the first device; and
  send the received third packet and the first packet to the second device.

20. The apparatus of claim 19, wherein the logic is further operable to:
  parse the received third packet and the first packet to determine billing information for the first device.

21. The apparatus of claim 16, wherein the logic is further operable to:
  receive, at the intermediary device, a request packet for data from the first device for the second device;
  forward the request packet to the second device;
  receive the second packet from the second device for the first device, the second packet in response to the request packet;
  forward the second packet to the first device, wherein the second acknowledgement acknowledges that the second packet sent from the second device was received by the first device.

22. The apparatus of claim 16, wherein logic operable to determine the packet was not received comprises logic operable to identify a missing sequence number in the request based on a sequence number in the first packet.

23. The apparatus of claim 16, wherein the second acknowledgement acknowledges that a series of packets including the second packet was received by the first device from the second device.

\* \* \* \* \*